G. W. CHURCH.
Bolting-Gages.

No. 196,074. Patented Oct. 16, 1877.

WITNESSES:
Chas. H. Kimball.
Chas. S. Mooney.

INVENTOR:
George W. Church
Per Atty.
William Henry Clifford

UNITED STATES PATENT OFFICE.

GEORGE W. CHURCH, OF GARDINER, MAINE.

IMPROVEMENT IN BOLTING-GAGES.

Specification forming part of Letters Patent No. 196,074, dated October 16, 1877; application filed August 31, 1877.

*To all whom it may concern:*

Be it known that I, GEORGE W. CHURCH, of Gardiner, in the county of Kennebec and State of Maine, have invented certain new and useful Improvements in Bolting-Gages; and I do hereby declare that the following is a full, clear, and exact description thereof, which will enable others skilled in the art to which it pertains to make and use the same, reference being had to the accompanying drawings, and to the letters of reference marked thereon, which form a part of this specification.

Figure 1:
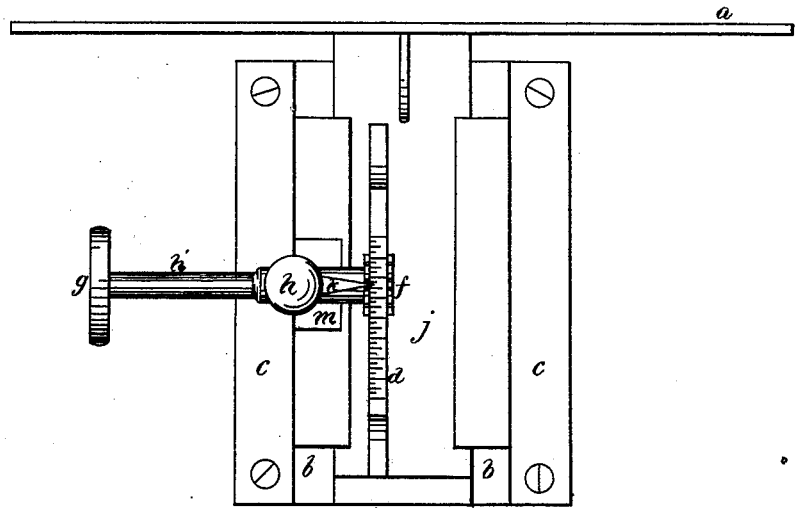
Figure 2:
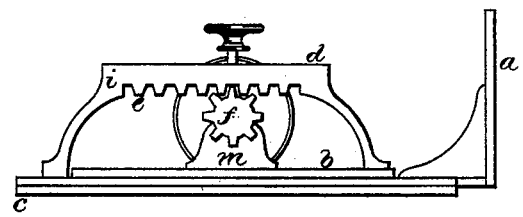
Figure 3:
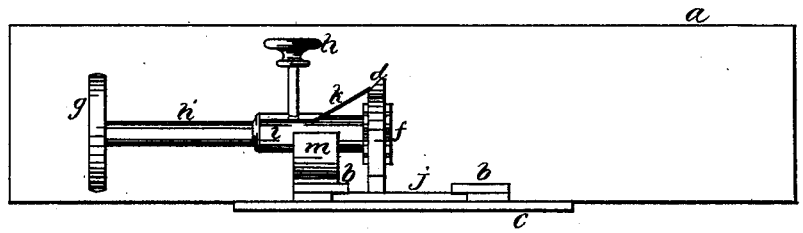

Figure 1 is a top plan; Fig. 2, a side elevation, and Fig. 3 an end view.

Same letters show like parts.

The object of my invention is to produce a new and improved attachment to the tables of circular saws, by which the width to which lumber is sawed may be accurately, quickly, and easily regulated. This effect is produced by a gage made to move backward and forward, as desired, so as to change at will the width of the space between one face of the gage and the saw. One edge of the lumber is placed against the gage, and then as a consequence a piece is cut from the lumber in width equal to the width of the said space. This will be clearly understood by proper references to the drawing.

$a$ is the gage. $b$ are guides. $c$ is the bed-plate of the device, which plate is bolted to the table in which the saw is set. $d$ is a scale by which the width of the lumber sawed is indicated. $e$ is a toothed rack on the under side of the frame $i$. $f$ is a toothed wheel working in the rack $e$. $g$ is a wheel rigidly set on the shaft $h'$, by which the toothed wheel $f$ is revolved. $j$ is a sliding bed, carrying the frame $i$, and moving or sliding in the guides $b$. $k$ is a finger or indicator, to show on the scale $d$ how far the gage $a$, sliding bed $j$, and frame $i$ have been moved by the devices $g$, $h$, $f$, and $e$. $h$ is a set-screw working through the sleeve $l$, to prevent the shaft $h'$ from revolving, and so hold the sliding bed $j$ at any desired point.

The operation of the machine is as follows: The degrees or distances marked on the scale $d$ show the whole distance between the gage and the saw. Thus, when the finger $k$ has moved up a certain distance on the scale $d$, the remaining degrees not passed over by the finger show the width of the lumber to be sawed. Turn the wheel $g$ so as to bring the gage $a$ at such distance from the saw as will make the strip of lumber sawed off of the desired width. Then place one edge of the lumber against the gage and press it against the saw.

The method by which the sliding bed is advanced has been perhaps sufficiently indicated by the above description.

The shaft $h'$ revolves in the sleeve or box $l$, set on the support $m$. The wheel $f$ matches the rack $e$ on the frame $i$. This frame is fastened to the sliding bed $j$, which carries the gage $a$. The scale $d$ moves under the finger $k$, which is attached to the top of the box or sleeve $l$.

What I claim as my invention, and desire to secure by Letters Patent, is—

The combination, with the table of a circular saw, of the gage $a$, sliding bed $j$, scale $d$, finger $k$, wheel $f$, rack $e$, and bed $c$, with its guides $b$, as herein set forth.

In testimony that I claim the foregoing as my own invention I affix my signature in presence of two witnesses.

GEORGE W. CHURCH.

Witnesses:
WM. HENRY CLIFFORD,
C. H. LEIGHTON.